Feb. 10, 1942.   J. H. SCHURCH   2,272,435
SINGLE PHASE MOTOR
Filed Dec. 2, 1939   2 Sheets-Sheet 1
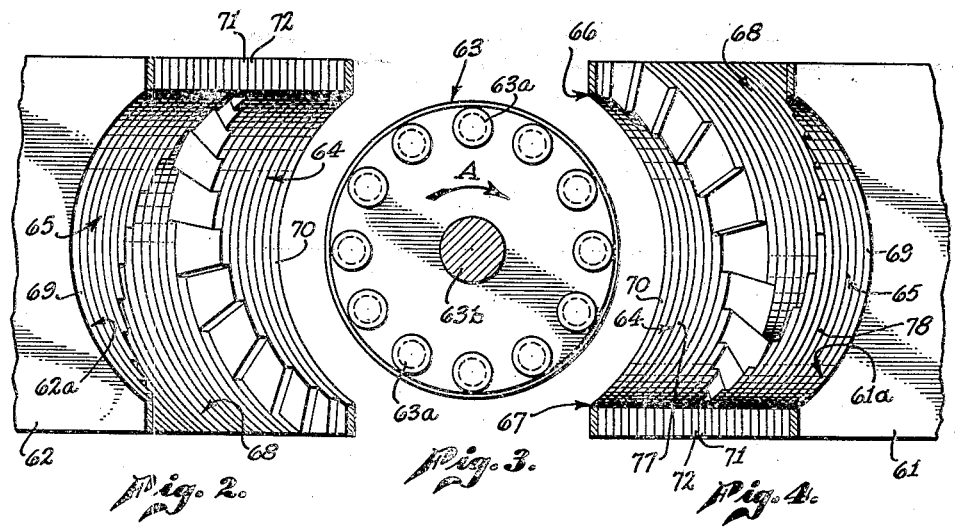
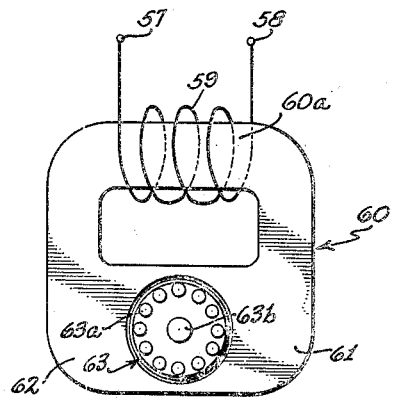
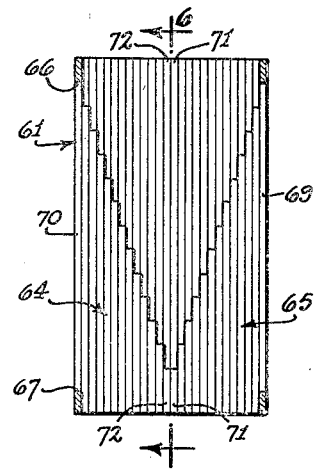
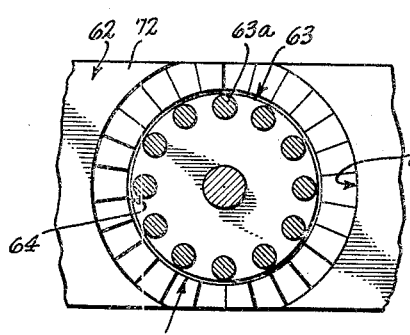
Inventor
JACOB H. SCHURCH,
By
Attorney Feb. 10, 1942.   J. H. SCHURCH   2,272,435
SINGLE PHASE MOTOR
Filed Dec. 2, 1939   2 Sheets-Sheet 2

Inventor
JACOB H. SCHURCH,
By Alfred W. Knight
Attorney

Patented Feb. 10, 1942

2,272,435

UNITED STATES PATENT OFFICE 2,272,435

SINGLE PHASE MOTOR

Jacob H. Schurch, Los Angeles, Calif., assignor, by direct and mesne assignments, of one-half to Gertrude Couleur, Glendale, Calif.

Application December 2, 1939, Serial No. 307,282

1 Claim. (Cl. 172—278)

This invention relates to electric motors and pertains particularly to a self-starting single-phase induction motor.

This application is a continuation-in-part of my copending application Serial No. 171,948, filed October 30, 1937 and issued on January 2, 1940 as Patent No. 2,185,990.

The principal object of the invention is to provide a single-phase induction motor which is self-starting and does not require the use of a commutator, short-circuited windings, auxiliary starting windings, or centrifugal starting switches.

Another object of the invention is to provide a single-phase induction motor which may be started directly from the line without the use of any auxiliary starting equipment.

Another object of the invention is to provide a motor of the class described having a high starting torque.

A further object of the invention is to provide a self-starting single-phase induction motor which has a high power factor, in even the smallest sizes, while running.

Another object of the invention is to provide a self-starting single-phase induction motor which has a high efficiency.

Another object of the invention is to provide a self-starting single-phase induction motor which may be simply and inexpensively constructed and which may be easily adapted to production methods.

Further objects and advantages of the invention will either be specifically brought out in the following description or will become apparent therefrom.

Numerous arrangements have been utilized to start single-phase induction motors, the most common of which are shading the poles with short circuiting rings in the smaller sizes of motors, the use of auxiliary windings which are not used during running of the motor, and the use of a commutator to provide repulsion starting. Both of the last-described arrangements require the use of auxiliary switching mechanisms to change the connection of the motor after it has started and such arrangements necessarily increase the initial cost and the cost of maintenance of such motors. The use of shaded poles generally increases the losses in the motors and such motors are generally inefficient.

The self-starting single-phase motor of this invention comprises, in general, a rotor and a stator whose core is provided with a winding and with one or more pairs of concentrated pole members having faces extending peripherally and axially with respect to the rotor and spaced radially from the rotor. The winding is adapted upon connection to a source of alternating current to oppositely polarize successive poles and their respective faces. Preferably all, but at least one, of the pole members is so shaped and arranged that in at least a part of the peripheral extent of the face thereof, the magnetic flux passing through peripherally successive axially extending portions of said face progressively increases in a peripheral direction along said face so as to exert a starting torque on the rotor and cause rotation thereof in said direction. The increase in total flux through the face of a pole as above described is obtained by increasing the effective axial length of the face of the pole progressively in the peripheral direction. The manner in which this increase is provided will be described more fully hereinafter.

It is preferable to provide this progressive increase in the total flux passing through the successive peripheral portions of the pole faces, along substantially the entire peripheral extent of each of said pole faces in order to obtain a maximum starting torque. Furthermore, it is advantageous to construct the pole faces so that the increase in total flux passing through said portions or areas progresses in a uniform and preferably straight-line manner.

While it is to be understood that I do not wish to restrict myself to any exact theory as constituting the fundamental basis of this invention, the following probable explanation may be given, which is based on known principles and which is apparently confirmed by actual operating tests.

Considering a two-pole motor as an example, the rotor may be considered as a two-pole magnet which has its poles located at points in the air gap between the two stator pole faces. In cases where the flux distribution produced by the pole faces in the air gap is symmetric with respect to an axially extending line, there will be no tendency for the magnetically polarized rotor to rotate. However, in cases in which the field is inhomogeneous, that is, in cases in which the flux distribution is asymmetric and there is a progressive increase in the total flux passing through peripherally successive elongated areas extending axially across each pole face, there is a tendency for the magnetic poles of the rotor to move toward the region of high flux density. Thus the rotor may be considered to have a magnetic moment and the forces on the rotor will be equal to its magnetic moment multiplied by the change in flux density per unit peripheral length of the pole face. This force is present not only during starting of the motor but is also present during running. Extensive tests have shown that motors constructed to start and run with an inhomogeneous or asymmetric field follow closely the results as calculated on the basis of the above principles. Thus the motor of this invention starts and runs with a field flux which is substantially in phase at all portions of a pole face and does not require the use of any means for obtaining a polyphase flux in the pole faces.

The accompanying drawings are illustrative of certain forms of construction which may be utilized for producing self-starting single-phase induction motors according to my invention, and referring thereto:

Fig. 1 is a partly diagrammatic side elevation of a motor according to my invention;

Figs. 2, 3, and 4 are detailed views of portions of the motor illustrated in Fig 1, Fig. 3 being a view of the rotor in end elevation, and Figs 2 and 4 being views of the pole members in perspective;

Fig. 5 is a view of the face of the pole illustrated in Fig. 4, as developed in a plane;

Fig 6 is a sectional view through the motor taken along a line corresponding to line 6—6 in Fig 5.

Figure 7:
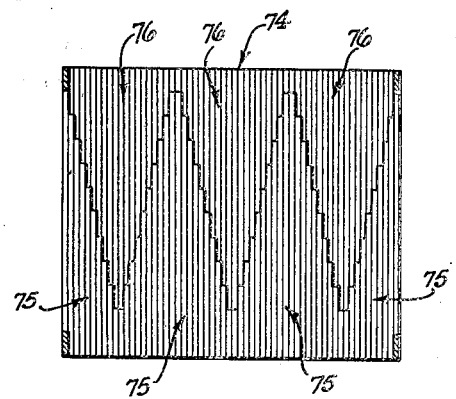
Figs. 7, 8, 9, and 10 are plane developed views of modified forms of pole faces which may be employed in the motor illustrated in Fig. 1.

Referring to Figs. 1 to 6 and particularly to Fig. 1, a single-phase induction motor is indicated generally at 60 and is shown as comprising suitably laminated concentrated pole members 61 and 62 which are provided with pole faces 61a and 62a, respectively. A squirrel-cage rotor is indicated at 63 and may comprise the usual laminated core provided with conductor bars 63a connected together at their ends by suitable means. A rotor shaft is indicated at 63b and the bearings and supports therefor are omitted for the purpose of clarity. The poles 61 and 62 are connected together by a magnetic yoke 60a about which is wound a suitable stator coil 59 provided with terminals 57 and 58 which may be connected to a source of alternating current to oppositely polarize the successive poles 61 and 62. The stator core comprises yoke 60a and pole members 61 and 62. Thus energization of the coil 59 produces a magnetic flux which traverses the magnetic circuit comprising the yoke, the poles, the rotor, and the air gaps between the pole faces and the rotor. The yoke and pole members are of course laminated and will ordinarily be made up with the same laminations in accordance with the construction usually employed in such skeleton type motors. In this regard, it should be understood that motors according to my invention may incorporate any of the conventional core and pole arrangements commonly used in the art, since the pole face construction of my invention may be readily adapted thereto. Therefore it will be understood that the skeleton construction illustrated in Fig. 1 is intended merely as a non-limitative example of a motor embodying my invention.

Referring now more particularly to Figs. 2, 3, and 4, the pole structure of my invention will be described in greater detail. In order to clearly illustrate the invention, the two poles shown in Figs. 2 and 4 may be considered as having been displaced in radially opposite directions from the rotor and then rotated in opposite directions about a line perpendicular to the rotor shaft sufficiently to expose the faces of each pole. The faces of the poles 61 and 62 are each provided with at least one portion which is spaced radially from the rotor 63 by a relatively small distance and with at least one portion which is spaced radially from the rotor by a relatively great distance. Thus the face of each pole is shown as made up of two portions 64 and 65 adjacent the respective axial ends thereof, which are spaced radially by a short distance from the rotor 63 and through which the flux density is substantially uniform. The axial length of these portions 64 and 65 progressively increases in a peripheral direction from the leading edge 66 to the trailing edge 67 of the pole face. Each pole further comprises a centrally located face portion 68 of relatively great radial spacing from the rotor 63. It will be noted that the axial extent of the portion 68 decreases progressively with the progressive increase in axial extent of the portions 64 and 65.

The poles are laminated structures and each pole is shown as comprising outer laminations 69 and 70 and central laminations 71 and 72. Fig. 6 is a sectional elevation taken between the central laminations 71 and 72 in a direction toward the lamination 70 in order to illustrate the extent of the radial spacings of the pole face areas 64 and 68 from the rotor 63. The air gap between portion 64 and the rotor is indicated by the arrow at 73 and is comparable to the spacing ordinarily employed between the pole faces and the rotor of conventional induction motors. The radial spacing of the face portion 68 from the rotor 63 is sufficient so that the flux contributed by this face 68 is negligible in comparison to the flux contributed by the effective face portions 64 and 65.

With the example illustrated in Figs. 1–6, each lamination which forms part of the effective portions 64 and 65 of a pole face has an end outline which conforms for a certain distance to the radius of those face portions, the distance being shortest near the center of the pole and longest near the outside of the pole; and then conforms for substantially the remaining width of the lamination to the radius of the less effective portion 68. The end outline is completed by a radially extending line which joins the two curved lines. The shape of any lamination may be easily envisioned from an inspection of Figs. 4 and 6, for example.

The stator core may be defined as comprising a plurality of stacked laminations which provide one or more pairs of concentrated pole members. The pole members each have pole face portions 64 and 65 which are spaced a relatively small distance from the rotor. The surface contour of these face portions is defined by the inner peripheries of the laminations and conforms generally to the surface contour of the rotor. A plurality of the laminations in each pole face in this instance are recessed outwardly from their inner peripheries throughout portions of their circumferential length, the circumferential length of the recess being different in different ones of the laminations. With the poles illustrated in Figs. 2 and 4, the depth of this recess corresponds to the radial distance between face portions 64 and 68, and the contour of the circumferential length of a recess conforms to the contour of the face portion 68. The laminations are so stacked and arranged that the pole face portions defined by the unrecessed inner peripheries of the laminations (face portions 64 and 65) progressively increase in axial extent in a peripheral direction along the face of said pole.

The flux density over each of the face portions 64 and 65 is substantially uniform and the magnetic flux through peripherally successive axially extending portions of each of these portions 64 and 65 progressively increases in the direction of the increasing axial extent of these portions. Hence, the effective axial length of the face of each pole increases progressively in a peripheral direction. It will be seen that the outer laminations 69 and 70 completely embrace the periphery of the rotor 63. I have found that the operation of the motor is more satisfactory when the outer laminations are constructed in this manner than when the poles are constructed as two completely separated units.

A further modification of the pole face shown in Fig. 5 is shown in Fig. 7, in which a pole face 74 is made up of a plurality of areas 75 of relatively small radial spacing and a plurality of areas 76 of relatively great radial spacing. This pole may be constructed in the same manner as the pole shown in Fig. 5 and has the same advantages as the pole of Fig. 5. This pole is, however, better applicable to motors in which the pole faces are of relatively great axial extent. As in the case of Fig. 5, the areas 75 each progressively increase in axial extent in a peripheral direction along the pole face and produce a flux distribution in such manner that the magnetic flux through peripherally successive axially extending portions of the pole face formed thereby progressively increases in the same peripheral direction around the pole face and exerts a starting torque on the rotor.

Figure 8:
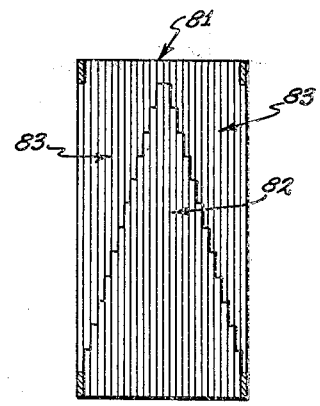
Figure 9:
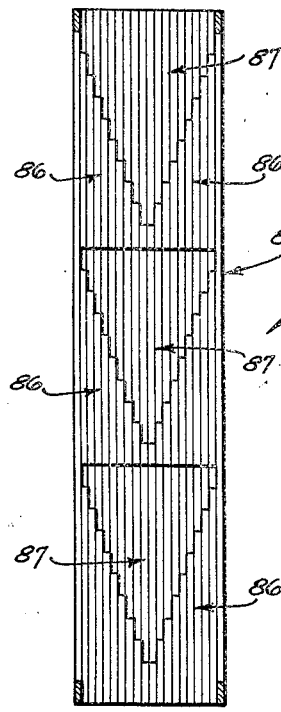
Figure 10:
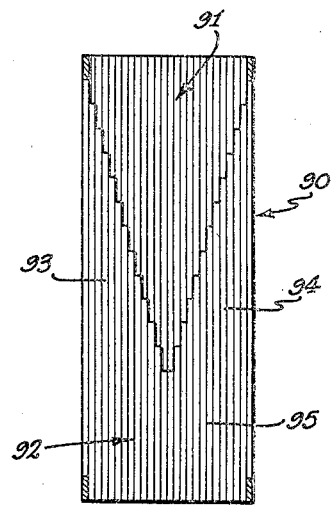

In Figs. 8, 9, and 10 I have illustrated further modifications of pole faces which embody my invention. Each of these pole faces is made up of one or more areas which are spaced radially from the rotor by a relatively small distance, which may be identified as effective areas, and of one or more areas which are spaced radially from the rotor by a relatively great distance and which may be identified as relatively ineffective areas. In each of these figures the pole area may be made up of laminations which have end outlines comparable to those shown in Figs. 4 and 6.

In Fig. 8 a pole member 81 is shown as comprising a single face portion 82 which is spaced by a relatively small distance from the rotor and a pair of face portions 83 which are spaced a relatively great distance from the rotor. Thus with this pole face, as with the pole face illustrated in Fig. 5, there is a progressive increase in the effective axial extent of the pole face in a direction along its periphery.

Referring now to Fig. 9, a pole member 85, having a relatively long face such as may be used with a large diameter rotor, is illustrated. This pole face is shown as comprising a plurality of peripherally successive similar areas, each of which corresponds generally to the pole face illustrated in Fig. 5. Each area is shown as comprising an outer pair of similar triangular face portions 86 which are spaced a relatively small distance from the rotor, and a central triangular face portion 87 which is spaced a relatively great distance from the rotor. Thus, over each of the above-described areas there is a progressive increase in the same peripheral direction in the effective axial extent of the pole face.

It is not necessary that there be a progressive increase in the effective axial extent of a pole face over the whole peripheral extent thereof. For example, in Fig. 9 a pole member 90 is shown as comprising a face portion 91 which is spaced a relatively great distance from the rotor and an effective face portion 92 which is spaced a relatively small distance from the rotor. The portion 92 comprises face portions 93 and 94 which lie on opposite sides of the portion 91, and the effective axial extent of the pole face provided by the portions 93 and 94 progressively increases in a peripheral direction. Over the remaining effective face portion 95 the flux density is substantially uniform, and since this face portion is substantially rectangular, the flux passing through each successive axially extending part of this portion is the same. However, through the face portions 93 and 94 there is a progressive increase in a peripheral direction of the magnetic flux passing through peripherally successive portions thereof.

It should be understood that the total flux through peripherally successive, axially extending portions of a pole face need not increase in a uniform or straight line manner as illustrated, and any desired type of increase may be utilized as long as it is progressive, and the face outlines of the various pole face portions may of course be modified accordingly. In this connection, it may also be stated that the outwardly extending recess provided at the inner periphery of the pole face (the face portion 68 in Fig. 4) need not provide a face portion which is concentric with the rotor. Also, it is not necessary for this face portion to be spaced as far from the rotor as it is in Fig. 6.

Motors constructed according to Figs. 1 through 10 show definite advantages from the standpoint of heat dissipation. Taking Fig. 4 as an example, the flux density will be substantially uniform over the areas 64 and 65 so that the heat losses therein will be substantially uniform over each portion of the area. Since this area is somewhat triangular, the heat centers for each of these areas will be indicated generally by the points 77 and 78. These points lie relatively close to the outside laminations 69 and 70 respectively and adjacent the trailing edge of the pole face. Heat may, therefore, be more readily dissipated from this form of motor since the heat center is relatively close to the outside edges thereof and also because the cut-out face portion 68 exposes a portion of the pole to the air which is present between the pole face and the rotor. These advantages are also present to a lesser or greater extent in the other forms of pole faces illustrated herein.

It will be apparent that any of the common forms of rotor construction may be used, for example, the common form of construction utilizing cast rotor bars may be used. However, it may be well to state that certain rotor constructions perform better than others. Thus, rotors having an even number of conductors show better performances than rotors having an odd number of conductors, and I have also found that rotors having a skew approximately equal to the distance between successive rotor conductors show better performances than rotors having more or less skew. These relations appear to hold true for all forms of the motor shown herein. It should also be noted that I prefer to utilize rotors having greater diameter than length, whereby greater efficiencies may be obtained and ventilating ducts may be provided in the iron. Furthermore, rotors providing separate circuits for each pair of rotor conductors, rather than end rings which interconnect all the rotor conductors, show definite advantages.

Although the specific description has been primarily directed to examples of motors in which each pole is shaped and arranged so as to provide an asymmetric flux distribution at the face thereof, it is to be understood that motors in which only a single pole member has the desired asymmetric flux distribution at its face will have self-starting characteristics.

It is also believed apparent that this invention is applicable to motors having any desired number of poles, and I do not choose to be limited to the modifications shown and described herein, but rather to the scope of the appended claim.

I claim:

A self-starting single phase induction motor which comprises: a rotor; and a stator comprising a plurality of stacked laminations providing one or more pairs of concentrated pole members having pole face portions spaced a relatively small distance from said rotor and conforming generally to the surface contour of said rotor, the surface contour of said face portions being defined by the inner peripheries of said stacked laminations, a plurality of the laminations in at least one of said pole members being recessed outwardly from their inner peripheries throughout portions of their circumferential length, the circumferential length of the recesses being different in different ones of said laminations, and said laminations being so arranged that the pole face portion defined by the unrecessed inner peripheries of said laminations progressively increases in axial extent in a peripheral direction along the face of said pole.

JACOB H. SCHURCH.